(12) United States Patent
Borst et al.

(10) Patent No.: US 6,973,059 B1
(45) Date of Patent: Dec. 6, 2005

(54) METHOD FOR FREQUENCY HOPPING IN A TDMA WIRELESS COMMUNICATION SYSTEM

(75) Inventors: Simon C. Borst, Union County, NJ (US); Terry Si-Fong Cheng, Morris County, NJ (US); Adrian R. Flewitt, Gloucestershire County (GB); Sudheer A. Grandhi, Morris County, NJ (US); Roland K. Henter, Nuremberg (DE); Martine M. Herpers, Erlangen (DE); Hans-Juergen Kettschau, Eckental (DE); Boris D. Lubachevsky, Somerset County, NJ (US); Michael Soellner, Erlangen (DE)

(73) Assignee: Lucent Technologies Inc., Murray Hill, NJ (US)

( * ) Notice: Subject to any disclaimer, the term of this patent is extended or adjusted under 35 U.S.C. 154(b) by 899 days.

(21) Appl. No.: 09/659,590

(22) Filed: Sep. 11, 2000

(51) Int. Cl.[7] .............................................. H04Q 7/00

(52) U.S. Cl. ...................... 370/330; 370/337; 370/347; 455/452.2; 455/513

(58) Field of Search ............................ 370/336, 337, 370/343, 344, 345, 347, 436, 437, 442, 478, 370/480, 498, 329–332, 252; 375/131, 132, 375/135, 138; 455/450, 451, 452.1, 452.2, 455/509, 513

(56) References Cited

U.S. PATENT DOCUMENTS

| | | | | |
|---|---|---|---|---|
| 5,581,548 A | * | 12/1996 | Ugland et al. | 370/330 |
| 5,666,655 A | * | 9/1997 | Ishikawa et al. | 455/512 |
| 5,844,894 A | * | 12/1998 | Dent | 370/330 |
| 5,963,865 A | * | 10/1999 | Desgagne et al. | 455/450 |
| 6,108,321 A | * | 8/2000 | Anderson et al. | 370/329 |
| 6,240,125 B1 | * | 5/2001 | Andersson et al. | 375/132 |
| 6,298,081 B1 | * | 10/2001 | Almgren et al. | 375/132 |
| 6,640,104 B1 | * | 10/2003 | Borst et al. | 455/450 |
| 2001/0048691 A1 | * | 12/2001 | Chang et al. | 370/442 |

* cited by examiner

*Primary Examiner*—Ricky Ngo
*Assistant Examiner*—Nittaya Juntima

(57) ABSTRACT

The interference on the available communication frequencies is measured during an idle time slot over a first period of time at a first rate. The available frequencies are prioritized based on the interference measurements, and a list is formed of the frequencies having the lowest interference measurements. Interference measurements are made at a second rate, greater than the first rate, for a second period of time less than the first period. When a call is assigned, the interference level requirements for the call are given, and the carrier power level of the call is measured. The carrier-to-interference ratio of each frequency in the list is determined using the second interference measurements and the measured carrier power. The frequencies in the list meeting the interference level requirements for the call are then selected, and frequency hopping while serving the call is performed using the selected frequencies.

28 Claims, 5 Drawing Sheets

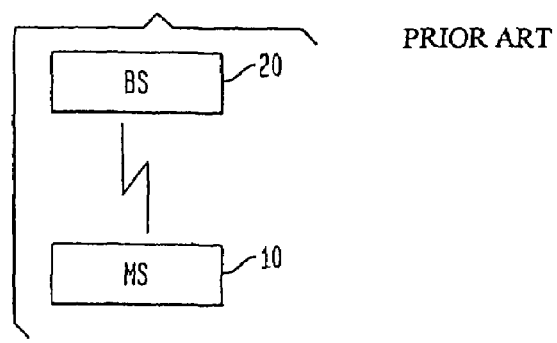
PRIOR ART
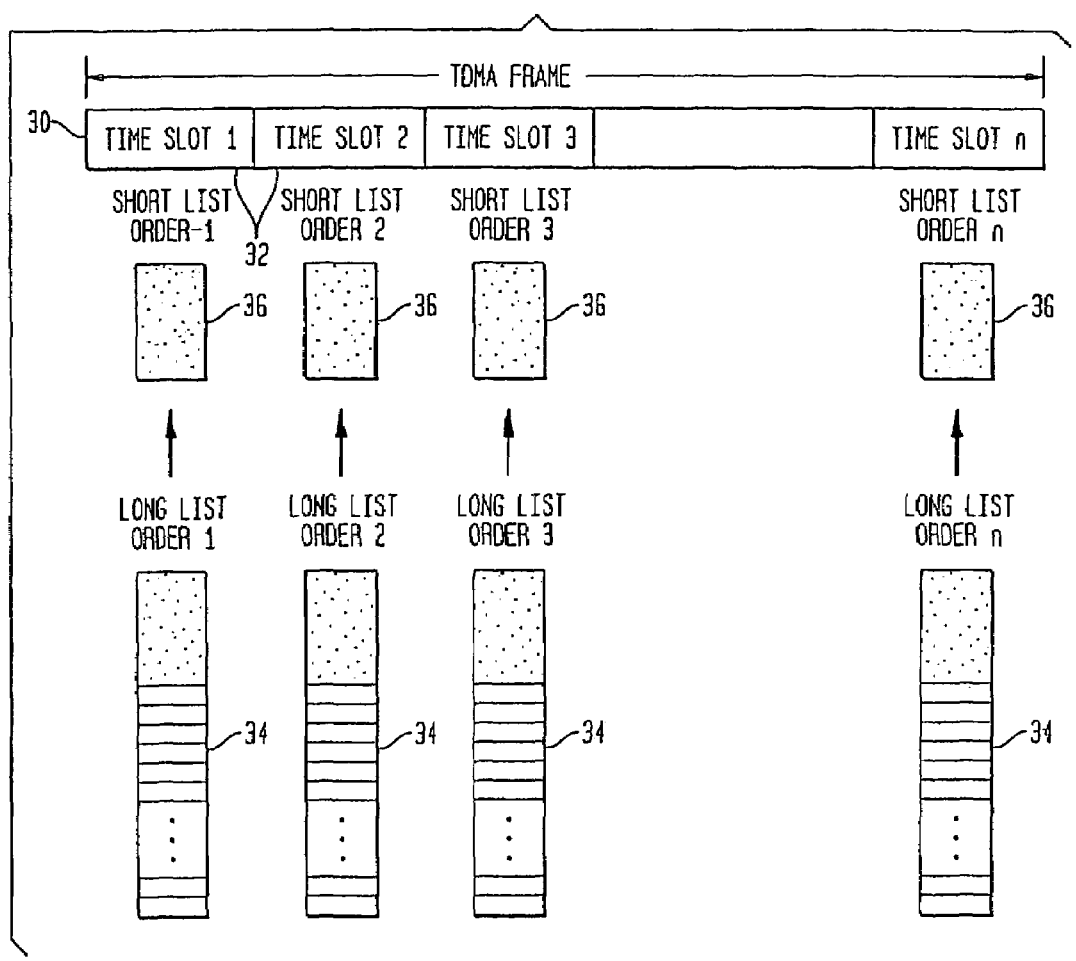

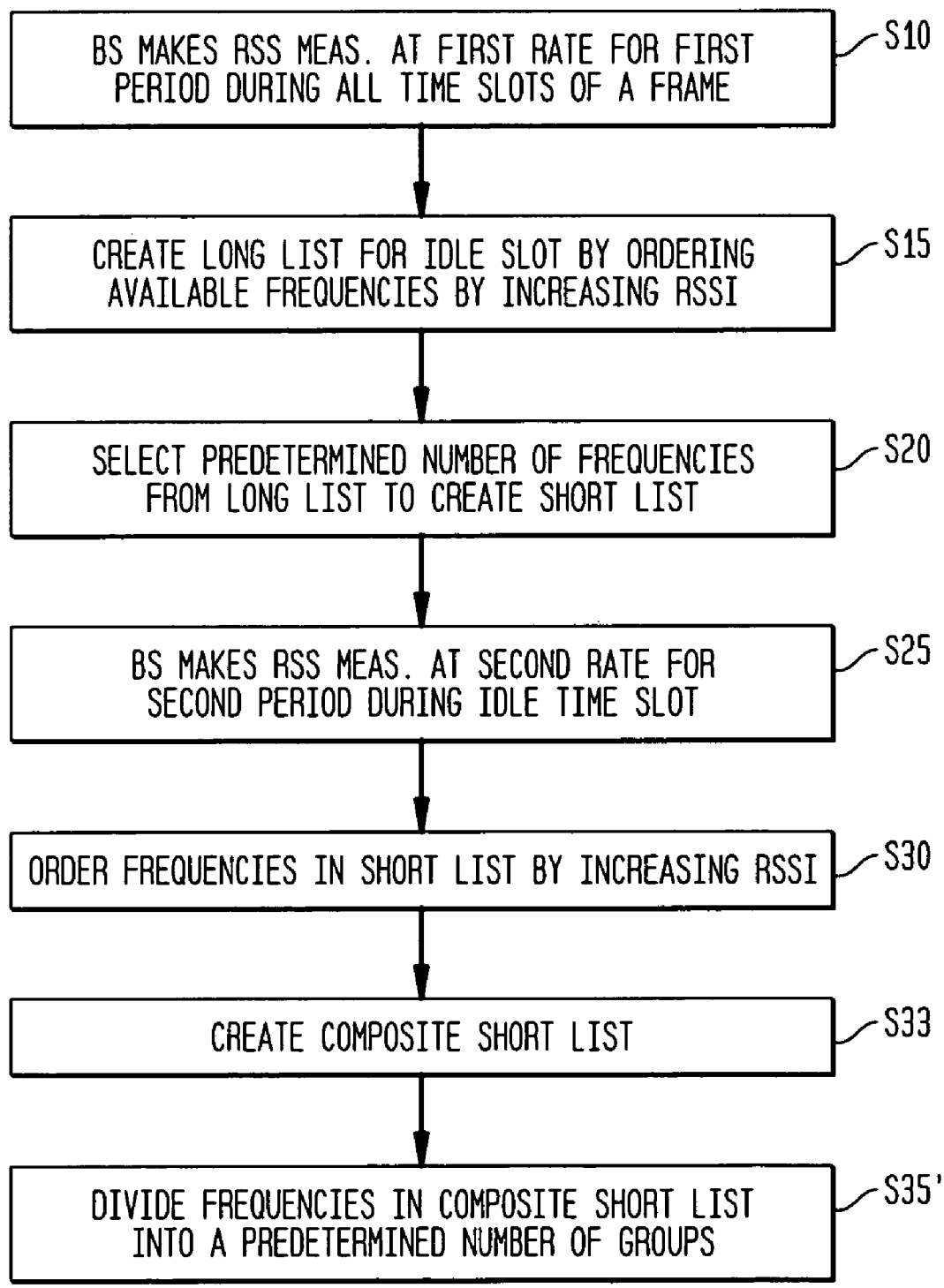

METHOD FOR FREQUENCY HOPPING IN A TDMA WIRELESS COMMUNICATION SYSTEM

BACKGROUND OF THE INVENTION

1. Field of the Invention

The present invention relates to wireless communication; and more particularly, to frequency hopping in a time division multiple access (TDMA) wireless communication system.

2. Description of Related Art

Traditionally in Cellular/PCS systems fixed channel assignment (FCA) has been used for spectrum management. FCA is known to perform satisfactorily for uniform traffic (especially heavy traffic) and regular hexagonal cell layout. However, for non-uniform traffic and non-regular cell layout FCA can suffer performance degradation in call capacity and quality. In addition FCA requires elaborate cell-site engineering and laborious manual processes to install and configure the system.

A number of dynamic channel assignment (DCA) algorithms have been proposed that adapt to traffic and some that adapt to both traffic and interference. DCA has the potential to offer better performance in call capacity and quality than FCA; especially under scenarios of non-uniform traffic and non-regular cell layout. However, when the spectrum is partitioned such that the number of time slot channels in a time division multiple access (TDMA) frame is higher (and the number of frequencies is correspondingly lower) the reuse gain from dynamically assigning frequencies to sectors/cells may decrease due to the following constraint prevalent in some systems. A radio in a sector/cell in these systems when tuned to a frequency cannot tune (or hop) to another frequency when serving a call on any time slot of the TDMA frame. This results in a loss of flexibility in assignment of frequencies to calls.

SUMMARY OF THE INVENTION

The method according to the present invention provides flexibility in assigning frequencies to a call. Specifically, the method according to the present invention provides for hopping among frequencies while serving a call.

According to one embodiment, the interference on the available communication frequencies is measured during an idle time slot of a TDMA frame over a first period of time (e.g., several frames) at a first rate. Then, the available frequencies are prioritized based on the interference measurements, and a list is formed of a number of the frequencies having the lowest interference measurements. Second interference measurements are made again at a second rate, greater than the first rate, for a second period of time less than the first period of time.

When a call is being assigned to the idle time slot, the interference level requirements for the call are given (e.g., a minimum carrier-to-interference ratio that must be maintained), and the carrier power level of the call is measured. The carrier-to-interference ratio of each frequency in the list is then determined using the second interference measurements and the measured carrier power. The frequencies in the list meeting the interference level requirements for the call are then selected, and frequency hopping while serving the call is performed using the selected frequencies.

In the above-described embodiment, the first and second interference measurements are made for each time slot when the time slot is idle. In a second embodiment, the first interference measurements are made for all idle time slots in the frame. Hence, instead of having different sets of first interference measurements associated different idle time slots, one set of first interference measurements are associated with each of the idle time slots. Furthermore, in the first embodiment one list for a time slot could include different frequencies than in the list for another time slot. In the second embodiment, however, the list for each time slot includes the same frequencies.

In a third embodiment, the first interference measurements are made in the same manner as the second embodiment, but the lists associated with each time slot are combined to create a composite list. The frequencies for use in frequency hopping are then selected as described above, but are selected from the composite list.

BRIEF DESCRIPTION OF THE DRAWINGS

The present invention will become more fully understood from the detailed description given hereinbelow and the accompanying drawings which are given by way of illustration only, wherein like reference numerals designate corresponding parts in the various drawings, and wherein:

FIG. 1 illustrates a portion of a conventional wireless communication system;

FIG. 2 illustrates a TDMA frame divided into a plurality of time slots and the long and short lists associated with those time slots;

FIG. 7 illustrates processing to create and maintain short lists according to a third embodiment of the present invention.

DETAILED DESCRIPTION OF THE PREFERRED EMBODIMENTS

Figure 3:
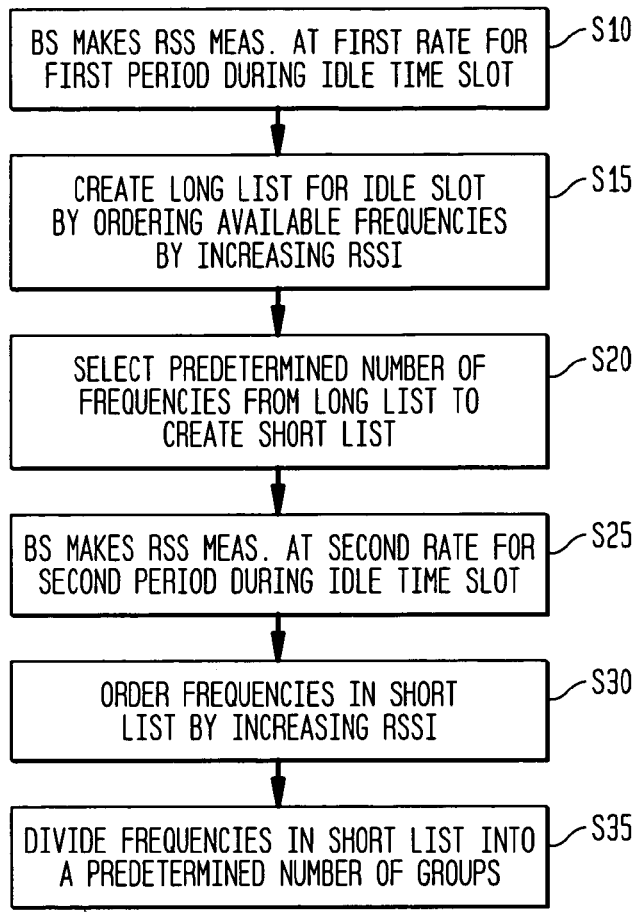
FIG. 3 illustrates processing to create and maintain short lists according to a first embodiment of the present invention.

FIG. 1 illustrates a portion of a conventional wireless communication system, wherein a mobile station 10 communicates through an air interface with a base station 20. In a time division multiple access (TDMA) wireless communication system, time is divided into discrete intervals called frames, and each frame includes a number of time slots, the number of which depends upon the particular standard governing operation of the TDMA wireless communication standard. FIG. 2 illustrates a frame 30 divided into a plurality of time slots 32. Each mobile station 10 served by the base station 20 is assigned a time slot 32 during which to communicate with the base station 20 and during which the base station 20 communications with the mobile station 10. As such, a time slot 32 is often referred to as a communication channel between a particular mobile station 10 and the base station 20. Time slots 32 that are currently unassigned to handle the communication needs of a mobile station 10 are referred to as idle time slots.

It should be understood that communication from the mobile station 10 to the base station 20 occurs at one frequency (the uplink frequency), while communication from the base station 20 to the mobile station 10 occurs at another frequency (the downlink frequency). The base station 20 has several uplink and downlink frequency pairs available to it for establishing a communication channel with a mobile station 10. Furthermore, it will be appreciated that the uplink and downlink frequency pairs are associated with either an entire cell if the base station 20 controls an omni-directional transmission/reception antenna structure or are associated with a sector of a cell if the base station 20 controls directional transmission/reception antenna structures.

During operation, the TDMA wireless communication system may be synchronized or unsynchronized. In a synchronized TDMA wireless communication system, the time slots of each frame of each base station 20 are synchronized across the system, while no such synchronization exists in an unsynchronized system. A first embodiment of the present invention will be described for a synchronized TDMA wireless communication system, while second and third embodiments of the present invention will be described for an unsynchronized TDMA wireless communication system.

Figure 4:
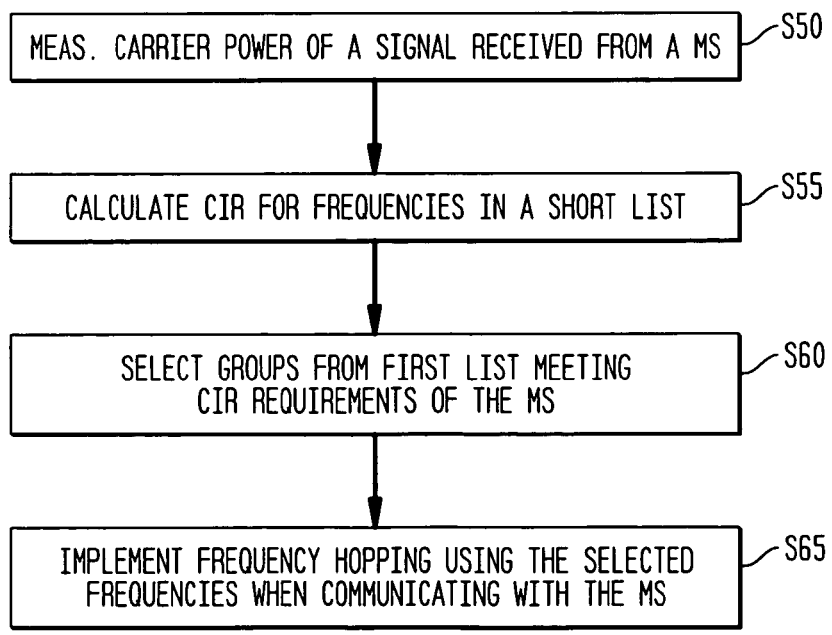
FIG. 4 illustrates processing to performing frequency hopping using a short list according to the present invention.

The first embodiment of the present invention will be described with respect to FIGS. 2–4. FIGS. 3 and 4 cooperatively illustrates a flow chart of the method of frequency hopping in a synchronized TDMA wireless communication system. More specifically, FIG. 3 illustrates processing to create and maintain a short list (discussed in detail below) that takes place with respect to each time slot 32 in the method of frequency hopping. Accordingly, while the operation with respect to a single time slot 32 will be described in detail, it should be understood that this processing is applied to each time slot 32 in the frame 30.

As shown in FIG. 3, step 10, when a time slot 32 is idle, the base station 20 measures the received signal strength (RSS) at each available uplink frequency available to the base station 20. While the present invention will be described with respect to received signal strength measurements made on the uplink frequencies available to the base station 20, the received signal strength measurements could instead be made on the downlink frequencies by the mobile station 10 or the received signal strength measurement on the uplink and downlink frequencies could be combined to form a composite received signal strength measurement.

Specifically, the base station 20 makes the signal strength measurements at a first sampling rate (e.g., once every three minutes) only during the idle time slot 32, and then a weighted average of the samples is taken over a first period of time (e.g., sixty minutes) to obtain an RSS indicator (RSSI). Because time does not stand still, it will be appreciated that the RSSI value is a moving average that is maintained for each available uplink frequency.

Because the time slot 32 is idle, the RSSI value indicates the level of interference on the associated uplink frequency. Consequently, it will be understood that other methods of interference estimation other than that described above could be used without departing from the spirit and scope of the present invention.

Next, the available uplink frequencies are ordered by increasing RSSI value in a long list 34 in step S115. As a result, and as shown in FIG. 2, a long list 34 will be kept for each of the time slots 32 in the frame 30. Furthermore, it will be understood that because the RSSI values are constantly changing, the order of the uplink frequencies in each of the long lists 34 constantly changes.

As shown in FIG. 3, in the step S20, a predetermined number of the available uplink frequencies at the top of the long list 34 (i.e., those frequencies having the lowest RSSI values and thus lowest interference levels) are selected to create a short list 36. In a preferred embodiment, the predetermined number equals the number of transceivers in the sector/cell of the base station 20 plus a margin. As with the long list 34, a different short list 36 that constantly varies is created and kept for each time slot 32 of the frame 30. Instead of selecting a predetermined number of frequencies from the long list 34 to create the short list 36, the short list 36 can be created from frequencies in the long list 34 having RSSI values below a predetermined threshold.

Then, in step S25 the base station 20 determines RSSI values for each of the uplink frequencies in the short list 36. However, these RSSI values are based on RSS measurements made at a second sampling rate (e.g., once every five seconds), which is higher than the first sampling rate, and the weighted average is taken for samples obtained over a second period of time (e.g., ten seconds), which is less than the first period of time. Using these second RSSI values, the base station 20 orders the frequencies in the short list 36 by increasing RSSI value in step S30.

In a preferred embodiment, the averaging weights discussed above with respect to steps S10 and S25 are optimized for each list based on performance factors such as blocking rate (i.e., the failure rate for making calls because of insufficient resources at the base station 20) and dropping rate (i.e., the rate at which calls are dropped). Such optimization is well known, and therefore, will not be described in detail. Generally, however, as the blocking or dropping rate increase, the averaging weights for more recent measurements increase with respect to averaging weights for old measurements.

The frequencies in the short list 36 are then divided into groups in step S35. In a preferred embodiment, a group includes 3–4 frequencies. For example, if the number of frequencies in the short list is 10, the 10 frequencies are divided into 3 groups. The first group includes the first 3 frequencies in the short list 36 (i.e., those frequencies in the short list having the lowest RSSI values), the second group includes the next 3 frequencies, and the third group includes the last four frequencies in the short list.

The processing described above with respect to FIG. 3 takes place continuously while the time slot 32 is idle. When the time slot 32 is to serve as the communication channel between the base station 20 and a mobile station 10, then, referring to FIG. 4, communication between the base station 20 and the mobile station 10 is established in any well-known manner and the base station 20 measures the carrier power of the signal received from the mobile station 10 in step S50. Preferably, this measurement is an instantaneous measurement. Then, the base station calculates the carrier-to-interference ratio for each of the frequencies in the short list 36 of the time slot 32 using the measured carrier power and the RSSI value for the frequencies in the short list 36 in step S55. The base station 20, in any well-known manner, also obtains the CIR requirements for communication with the mobile station 10.

Next, in step S60, the base station 20 determines which of the frequency groups in the short list 36 satisfies the CIR requirements for the mobile station 10, and selects the frequencies in those groups with which to perform frequency hopping. The base station 20 in step S65 then performs frequency hopping using the selected frequencies according to any well-known frequency hopping algorithm. Namely, the present invention is not limited to a particular sequential/cyclic or random hopping algorithm.

An example of a cyclic hopping algorithm will now be described, but it is understood that the present invention is not limited to this hopping algorithm. Assume that a first group of 3 frequencies is selected in step S60 and the uplink frequencies are uf1, uf2 and uf3. The base station 20 informs the mobile station 10 of the selected frequencies. Then, the mobile station 10 will communicate with the base station 20 using frequency uf1 during the time slot 32 in a first frame, will use frequency uf2 during the time slot 32 in a second frame, will use the frequency uf3 during the time slot 32 in a third frame, and will repeat this sequence for subsequent frames. Similarly, the base station 20 communicates with the mobile station 10 using downlink frequencies df1, df2, and df3 respectively associated with uplink frequencies uf1, uf2 and uf3. Consequently, during the first, second and third frames, the base station 20 uses frequencies df1, df2 and df3, respectively, during the time slot 32.

It will be appreciated that the method as described with respect to FIGS. 3 and 4 can be varied in many ways without departing from the spirit and scope of the present invention. For example, the frequencies in the short list 36 do not need to be divided into groups. Instead, all of the frequencies or a subset of the frequencies satisfying the CIR requirements of the mobile station 10 could be selected in step S60. Furthermore, instead of selecting all of the groups satisfying the CIR requirements of the mobile station 10, the base station 20 could select less than all of the groups satisfying the CIR requirements. Also, while the processing described above with respect to FIG. 4 was described as initiated when setting up a call, this process can also be performed during call handoff, at periodic instants during the call, and/or as the result of events (e.g., significant changes in the short list). It will be appreciated that measuring carrier power during the call, as opposed to during call set up or handoff, may be difficult. Consequently, power measurements made on the control channel can be substituted for the carrier power measurement.

Next, the second embodiment of the present invention will be described. As discussed above, this embodiment is intended to apply to unsynchronized TDMA wireless communication systems, but could be applied to synchronized TDMA wireless communication systems.

Figure 5:
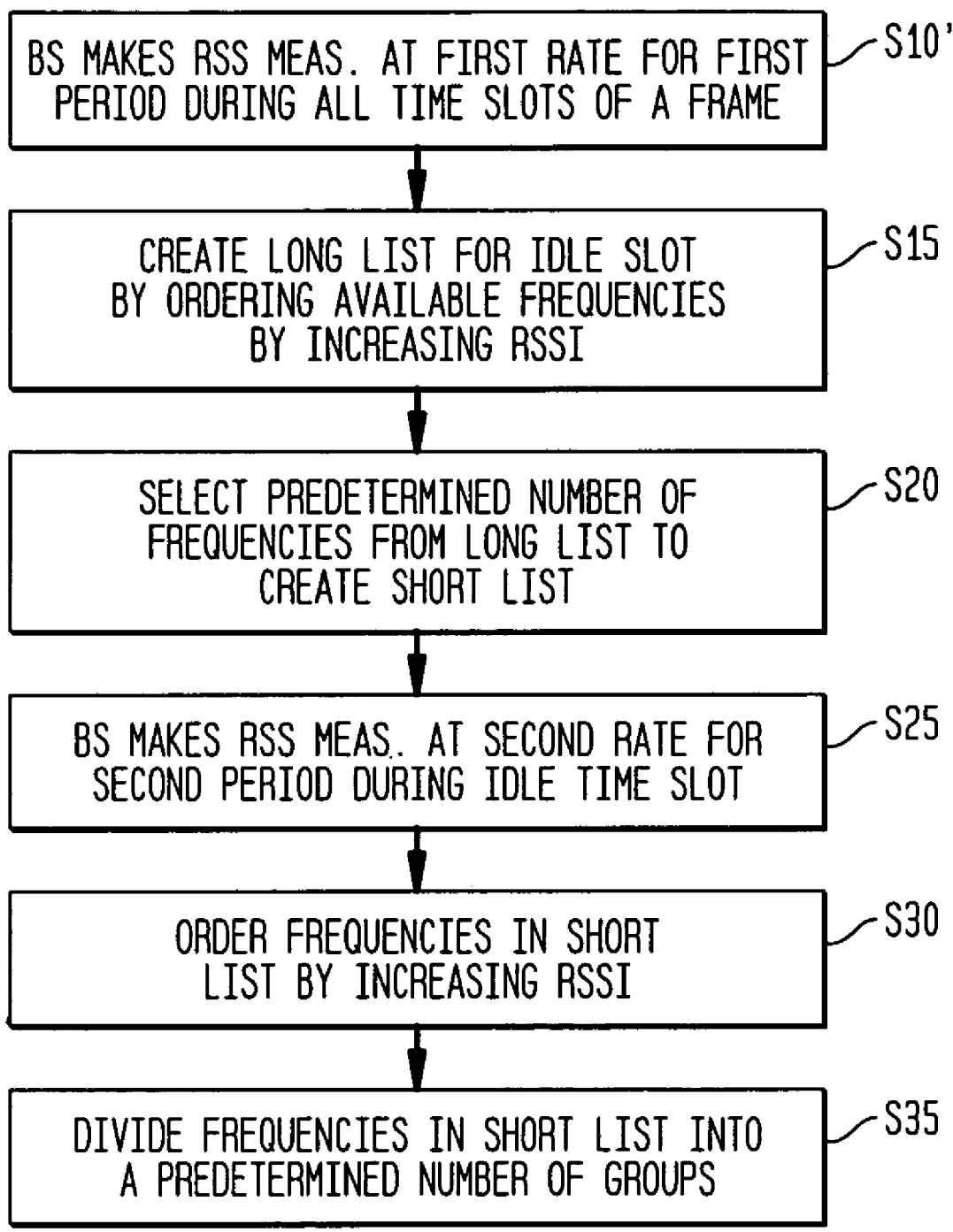
FIG. 5 illustrates processing to create and maintain short lists according to a second embodiment of the present invention.

As shown in FIG. 5, the second embodiment is substantially the same as the first embodiment described above with respect to FIGS. 3 and 4, except step S10 of FIG. 3 is replaced with step S10'. Consequently, only this difference between the second and first embodiments will be described.

Figure 6:
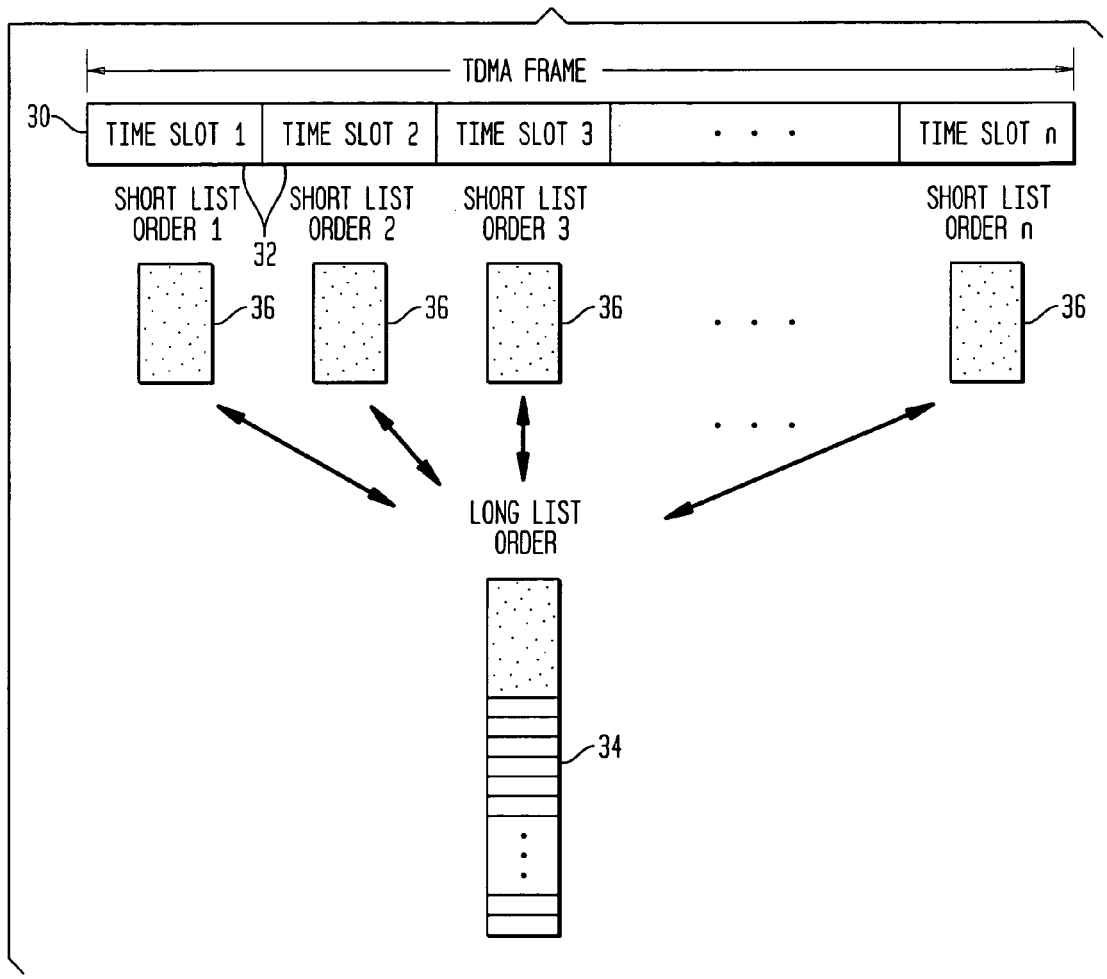
FIG. 6 illustrates a TDMA frame divided into a plurality of time slots and the long and short lists associated with those time slots according to the second embodiment of FIG. 5.

As shown in FIG. 5, the base station 20 makes the signal strength measurements at a first sampling rate (e.g., once every three minutes) during all the idle time slots 32, and then a weighted average of the samples is taken over a first period of time (e.g., sixty minutes) to obtain an RSS indicator (RSSI). It will be appreciated that instead of having a long list 34 associated with each time slot 32, the method according to the second embodiment creates a single long list 34 for all of the time slots 32 in the frame 30 as shown in FIG. 6. As a result, each of the short lists 34 will list the same frequencies, but possibly in different orders. The remainder of the operation according to the second embodiment is the same as described above with respect to the first embodiment.

It will be understood that the variations and modifications discussed above with respect to the first embodiment are equally applicable to this second embodiment.

Next, a third embodiment according to the present invention will be described. As discussed above, this embodiment is intended to apply to unsynchronized TDMA wireless communication systems, but could be applied to synchronized TDMA wireless communication systems.

As shown in FIG. 7, the third embodiment is substantially the same as the first embodiment described above with respect to FIGS. 3 and 4, except new step S10' has replaced step S10 in FIG. 3, a new step S33 has been inserted after step S30 in FIG. 3, and new step S35' has replaced step S35 in FIG. 3. Consequently, only these differences between the third and first embodiments will be described.

The method begins with new step S10' that was described above with respect to FIG. 5. Accordingly that description will not be repeated for the sake of brevity.

Turning to new step S33, after the short lists 36 are ordered in step S30, a composite short list is created. A predetermined number (e.g., 4) of frequencies at the top of each short list (i.e., the frequencies in each short list having the lowest RSSI values) are selected. If the same frequency is selected from more than one short list, the RSSI values are averaged. Then the selected frequencies are ordered into a composite short list by increasing RSSI value. Then, in step S35' the frequencies in the composite short list are divided into a predetermined number of groups. This is done in the same manner as discussed above with respect to step 35, therefore, step S35' will not be described in detail. The remainder of the operation according to the third embodiment is the same as described with respect to the first embodiment.

It will be understood that the variations and modifications discussed above with respect to the first embodiment are equally applicable to this third embodiment.

The invention being thus described, it will be obvious that the same may be varied in many ways. Such variations are not to be regarded as a departure from the spirit and scope of the invention, and all such modifications are intended to be included within the scope of the following claims. For example, while the embodiments of the present invention have been described as creating a long list and short list for each time slot or for all time slots, a long list and/or short list could be formed for an integer number of time slots.

We claim:

1. A method for frequency hopping in a time division multiple access wireless communication system, comprising:

first measuring, for at least one idle time slot, interference for a first period at a first rate on available communication frequencies in a coverage area;

forming a first list of frequencies from the available communication frequencies based on the first interference measurements;

second measuring, for the idle time slot, interference for a second period at a second rate on the frequencies in the first list;

determining an interference level requirement for a call associated with a time slot;

selecting frequencies from the first list meeting the interference level requirement based on the second interference measurements during the associated time slot; and performing frequency hopping for the call using the selected frequencies.

2. The method of claim 1, wherein the second rate is greater than the first rate and the second period is less than the first period.

3. The method of claim 1, wherein the forming step selects a number of the available communication frequencies having a lowest interference, the number being a predetermined number.

4. The method of claim 1, wherein the selecting step comprises:
   measuring a carrier power of the call;
   determining a carrier-to-interference (CIR) ratio for each frequency in the first list based on the second interference measurements and the measured carrier power;
   selecting each frequency in the first list having a CIR ratio greater than or equal to a desired CIR ratio associated with the call.

5. The method of claim 4, wherein the desired CIR ratio is a predetermined minimum CIR ratio for the call.

6. The method of claim 4, wherein the measuring a carrier power step measures the carrier power of the call during call set-up or call handoff.

7. The method of claim 1, wherein the selecting step comprises:
   dividing the frequencies in the first list into a predetermined number of groups based on the second interference measurements;
   measuring a carrier power of the call;
   determining a carrier-to-interference (CIR) ratio range for each group based on the second interference measurements and the measured carrier power;
   selecting each group having a CIR ratio range greater than or equal to a desired CIR ratio associated with the call.

8. The method of claim 1, wherein the selecting step comprises:
   dividing the frequencies in the first list into a predetermined number of groups based on the second interference measurements;
   measuring a carrier power of the call;
   determining a carrier-to-interference (CIR) ratio range for each group based on the second interference measurements and the measured carrier power;
   selecting one of the groups having a CIR ratio range greater than or equal to a desired CIR ratio associated with the call.

9. A method for frequency hopping in a time division multiple access wireless communication system, comprising:
   first measuring interference for a first period at a first rate on available communication frequencies in a coverage area;
   forming a first list of frequencies from the available communication frequencies based on the first interference measurements;
   second measuring, for at least one idle time slot, interference for a second period at a second rate on the frequencies in the first list;
   determining an interference level requirement for a call associated with a time slot;
   selecting frequencies from the first list meeting the interference level requirement based on the second interference measurements during the associated time slot; and
   performing frequency hopping for the call using the selected frequencies.

10. The method of claim 9, wherein the second measuring step makes said second measurements for each idle time slot.

11. The method of claim 9, wherein said first measuring step makes said first measurements during a frame including a predetermined number of time slots.

12. The method of claim 9, wherein the second rate is greater than the first rate and the second period is less than the first period.

13. The method of claim 9, wherein the forming step selects a number of the available communication frequencies having a lowest interference, the number being a predetermined number.

14. The method of claim 9, wherein the selecting step comprises:
   measuring a carrier power of the call;
   determining a carrier-to-interference (CIR) ratio for each frequency in the first list based on the second interference measurements during the associated time slot and the measured carrier power;
   selecting each frequency in the first list having a CIR ratio greater than or equal to a desired CIR ratio associated with the call.

15. The method of claim 14, wherein the desired CIR ratio is a predetermined minimum CIR ratio for the call.

16. The method of claim 14, wherein the measuring a carrier power step measures the carrier power of the call during call set-up or call handoff.

17. The method of claim 9, wherein the selecting step comprises:
   dividing the frequencies in the first list into a predetermined number of groups based on the second interference measurements;
   measuring a carrier power of the call;
   determining a carrier-to-interference (CIR) ratio range for each group based on the second interference measurements during the associated time slot and the measured carrier power;
   selecting each group having a CIR ratio range greater than or equal to a desired CIR ratio associated with the call.

18. The method of claim 9, wherein the selecting step comprises:
   dividing the frequencies in the first list into a predetermined number of groups based on the second interference measurements;
   measuring a carrier power of the call;
   determining a carrier-to-interference (CIR) ratio range for each group based on the second interference measurements and the measured carrier power;
   selecting one of the groups having a CIR ratio range greater than or equal to a desired CIR ratio associated with the call.

19. A method for frequency hopping in a time division multiple access wireless communication system, comprising:
   first measuring interference for a first period at a first rate on available communication frequencies in a coverage area;
   forming a first list of frequencies from the available communication frequencies based on the first interference measurements;
   second measuring, for each idle time slot, interference for a second period at a second rate on the frequencies in the first list;
   forming, for each idle time slot, a second list of the frequencies in the first list that is order according to the second interference measurements for the time slot;
   forming a composite second list from the second lists;
   determining an interference level requirement for a call associated with a time slot;
   selecting frequencies from the composite second list meeting the interference level requirement based on the second interference measurements during the associated time slot; and
   performing frequency hopping for the call using the selected frequencies.

20. The method of claim 19, wherein the forming a composite second list step selects a predetermined number of frequencies having a lowest second interference measurement from each second list.

21. The method of claim 19, wherein said first measuring step makes said first measurements during a frame including a predetermined number of time slots.

22. The method of claim 19, wherein the second rate is greater than the first rate and the second period is less than the first period.

23. The method of claim 19, wherein the forming step selects a number of the available communication frequencies having a lowest interference, the number being a predetermined number.

24. The method of claim 19, wherein the selecting step comprises:
   measuring a carrier power of the call;
   determining a carrier-to-interference (CIR) ratio for each frequency in the composite second list based on the second interference measurements and the measured carrier power;
   selecting each frequency in the composite second list having a CIR ratio greater than or equal to a desired CIR ratio associated with the call.

25. The method of claim 24, wherein the desired CIR ratio is a predetermined minimum CIR ratio for the call.

26. The method of claim 24, wherein the measuring a carrier power step measures the carrier power of the call during call set-up or call handoff.

27. The method of claim 19, wherein the selecting step comprises:
   dividing the frequencies in the composite second list into a predetermined number of groups based on the second interference measurements;
   measuring a carrier power of the call;
   determining a carrier-to-interference (CIR) ratio range for each group based on the second interference measurements and the measured carrier power;
   selecting each group having a CIR ratio range greater than or equal to a desired CIR ratio associated with the call.

28. The method of claim 19, wherein the selecting step comprises:
   dividing the frequencies in the composite second list into a predetermined number of groups based on the second interference measurements;
   measuring a carrier power of the call;
   determining a carrier-to-interference (CIR) ratio range for each group based on the second interference measurements and the measured carrier power;
   selecting one of the groups having a CIR ratio range greater than or equal to a desired CIR ratio associated with the call.

* * * * *